United States Patent [19]
Gault

[11] Patent Number: 6,166,519
[45] Date of Patent: Dec. 26, 2000

[54] CAMERA BATTERY ADAPTER SYSTEM

[76] Inventor: Bibb T. Gault, 401 Isom Rd., San Antonio, Tex. 78216

[21] Appl. No.: 09/488,727

[22] Filed: Jan. 20, 2000

[51] Int. Cl.[7] .................................................. H01M 10/46
[52] U.S. Cl. ......................... 320/107; 320/112; 429/100; D13/103
[58] Field of Search ................................. 320/107, 110, 320/112, FOR 101; 429/96, 100; D13/103

[56] References Cited

U.S. PATENT DOCUMENTS

| | | |
|---|---|---|
| 4,109,264 | 8/1978 | Pizzuti et al. . |
| 4,645,325 | 2/1987 | Inoue et al. . |
| 4,666,278 | 5/1987 | Uematsu et al. . |
| 5,155,512 | 10/1992 | Leonard . |
| 5,449,567 | 9/1995 | Yeh ..................................... 320/112 X |
| 5,506,488 | 4/1996 | Leiserson ................................ 320/112 |
| 5,630,193 | 5/1997 | Miyake et al. . |
| 5,917,306 | 6/1999 | Fisch et al. ............................. 320/107 |
| 5,977,746 | 11/1999 | Hershberger et al. ................... 320/112 |

*Primary Examiner*—Edward H. Tso
*Attorney, Agent, or Firm*—Jackson Walker L.L.P.

[57] ABSTRACT

A camera battery adapter system having a battery clip attachable to a standard 9 volt battery. The clip provides a conductive path to the bottom side of the battery from one of the battery terminals on the top side of the battery. A bottom holder cap receives the clip and battery and attaches to the second battery terminal providing a second conductive path to the top side of the cap from the second battery terminal.

6 Claims, 1 Drawing Sheet

CAMERA BATTERY ADAPTER SYSTEM

BACKGROUND OF THE INVENTION

The present invention relates to an adapter to convert a standard 9 volt battery so as to replace a five-cell, 6 volt nickel cadmium battery in an electronic camera. More particularly, the present invention provides a replacement battery system for the Hasselblad 500EL, ELM and ELX cameras without any modification to the camera structure.

Recently, the design of the Hasselblad camera was changed so as to utilize five (5) AA batteries. Modification of cameras designed before the battery change are expensive. Further, it has been found that use of a 9 volt system within these same cameras results in more exposures and faster camera winding time without lengthy battery recharge times. Since the standard 9 volt battery is a relatively inexpensive, easy to obtain item, the present inventive replacement system achieves significant cost savings.

SUMMARY OF THE INVENTION

The present invention is an adapter system for a 9 volt battery for utilization with an electronic camera. The system has two basic components—battery clip which carries the charge from a first terminal on the top end to the bottom end (or foot) of the 9 volt battery and a battery holder cap which surrounds the top end of the 9 volt battery (and clip) and which carries the charge from the second battery terminal to a connector strip extending along the top surface of the cap. In this manner, the standard 9 volt battery, which normally has both positive and negative terminals on the same top end of the battery, is converted to provide charge distribution along the top and the bottom ends of the battery. The holder cap insulates the positive from the negative distribution points.

DETAILED DESCRIPTION OF THE PREFERRED EMBODIMENT

Figure 1:
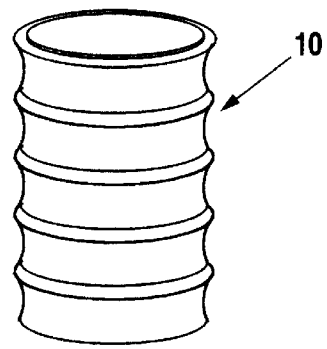
FIG. 1 illustrates a prior art five-cell six-volt battery used in electronic cameras. The present invention replaces this type of battery design.
Figure 2:
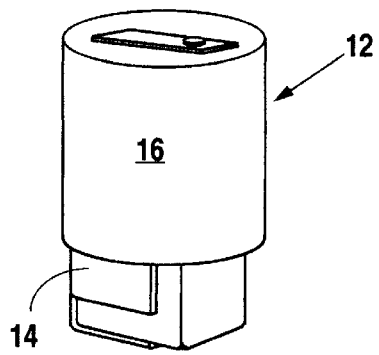
FIG. 2 shows the present invention with a standard 9 volt battery inserted within the holder cap and ready for installation into an electronic camera.

FIG. 1 shows a prior art five-cell, six volt battery 10 typically used in electronic cameras, specifically including the Hasselblad 500 EL, 500 ELM, and 500 ELX cameras. This battery design of FIG. 1 has been discontinued by the leading manufacturer of the design. The present inventive battery adapter system 12 shown in FIG. 2 is unique because it replaces the battery of FIG. 1 without any modification to the basic camera. Further, the system utilizes the readily available and inexpensive, standard 9 volt battery. The 9 volt battery provides more exposures and more rapid camera winding speed than the original battery 10.

Figure 3:
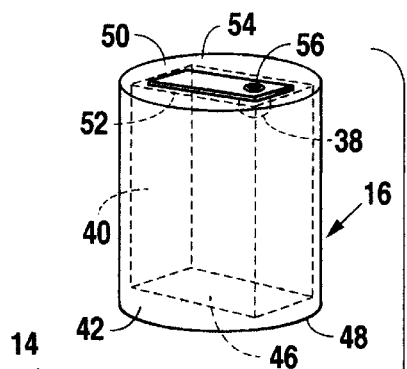
FIG. 3 illustrates an exploded perspective view of the present invention.
Figure 3:
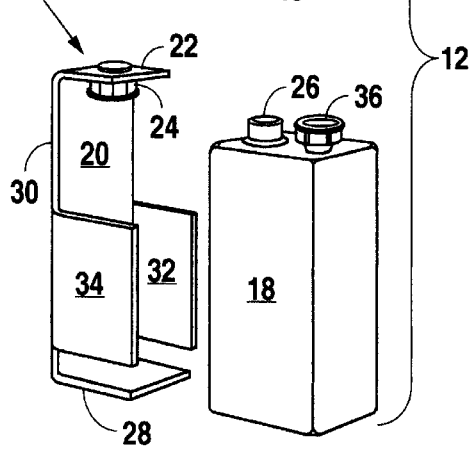

The system 12 of the present invention includes two main components, the battery clip 14 and the battery holder cap 16. FIG. 3 is an exploded perspective view showing the system 12 with a standard 9 volt battery 18. The clip 14 is composed of an 0.020 inch aluminum strap 20 bent into a "c" shape. A head section 22 is provided with a female battery snap connector 24 which attaches to the positive terminal 26 of the battery 18.

Figure 4:
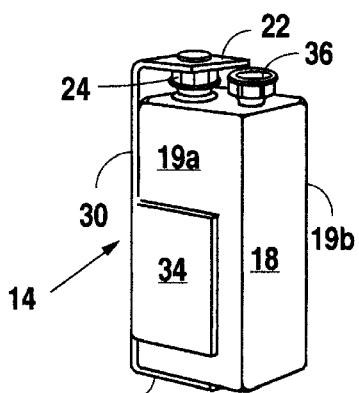
FIG. 4 shows the battery clip with the c-shaped conductive strap attached at the head section to the positive terminal of a 9 volt battery, the clamping arms attached to the battery, and the foot section extending beneath and carrying the charge to the bottom of the battery.

When the battery 18 is affixed to the clip 14, the foot section 28 becomes the positive conductor of the power source battery 18. The female battery connector attaches to the male positive battery terminal snap 26. The conductive body section 30 of the clip 14 extends downwardly from the head section 22, turns generally perpendicular to the body section and generally parallel to and spaced apart from the head section 22, to the foot section 28. Two spaced apart and generally parallel clamping arms 32 and 34 extend from a mid-section of the body section 30 of strap 20 to clasp the front 19a and rear 19b sides of the battery 18. The inherent resiliency of the aluminum material causes the arms 32 and 34 to urge against the battery sides to hold the battery tightly. FIG. 4 illustrates the clip 14 attached to the battery 18 with the positive terminal 26 attached to the female battery snap 24 and the negative battery terminal snap 36 available for attachment to the male battery holder cap connector 38 on the inside ceiling 52 of the holder cap 16.

FIG. 3 illustrates the construction of the battery holder cap 16 with a battery receiving chamber 40 formed therein. The cap body 42 is composed of a non-conductive ABS plastic material. The body is 1.375 inches in diameter and is 1.25 inches in height to fit the Hasselblad cameras, but could be any dimension to fit equivalent systems. A generally rectangular chamber 40 extends lengthwise through the body 42 from an opening 46 in one end 48 of the body to a closed top end 50. The chamber 40 and opening 46 are sized to accept the battery 18 with the attached clip 14.

A flat conductive strip 54 measuring 0.020×0.250×1.00 inch extends along the surface of the closed end of the body 42. The strip 54 is affixed or riveted to the surface by a conductive fastener 56 which extends through the top end 50 of the body 42 and fastens the male battery holder cap connector 38 to the inside ceiling 52 of the cap 16. These connections are all conductive and intended to provide a continuous electric charge flow from the negative battery terminal 36 to the flat strip 54. Strip 54 is electrically insulated from the foot section 28 of the battery clip 14 by the non-conductive body section 42 of the cap 16.

When the clip 14 is attached to the battery (FIG. 4) the clip and battery are inserted into chamber 40 of the cap 16. The negative battery terminal 36 snaps on to the male connector 38 inside the chamber. Thus, the negative charge may flow to the flat strip 54 while the positive charge flows to the foot section 28.

Figure 5:
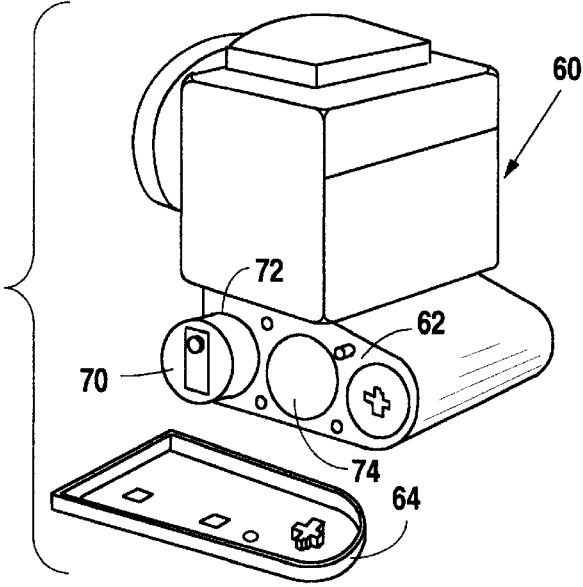
FIG. 5 shows an adapted battery in one of the battery chambers of an electronic camera with the camera housing lid removed.

FIG. 5 illustrates an electronic camera 60 with the battery compartment 62 exposed by the removal of lid 64. One battery adapter system 70 has been inserted into a first battery opening 72, a second battery opening 74 remains empty.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A camera battery adapter system for a 9 volt battery, said battery having a top side and a bottom side and first and second terminals on said top side of said battery comprising:
   a battery clip attachable to said first terminal of said battery, said clip providing a first conductive path from said top side of said battery to said bottom side of said battery; and
   a battery holder cap adapted to receive said battery and said clip when said clip is attached to said battery, said cap providing a second conductive path from said top side of said battery to a top side of said cap, said cap insulating said first path from said second path.

2. The system of claim 1 wherein said clip further comprises a c-shaped conductive strap having a head section with a first connector for connection to a first terminal of said battery; a body section extending from said head section; and a foot section on a distal end of said body section, said foot section extending below and beneath said bottom side of said battery.

3. The system of claim 2 wherein said foot section extends generally perpendicular to said body section and generally parallel to and spaced apart from said head section.

4. The system of claim 1 further comprising two spaced-apart clamping arms attached to said body section for engagement with said battery to secure said battery within said clip.

5. The system of claim 1 wherein said cap further comprises a non-conductive body portion having a battery receiving chamber sized to accept said clip and said battery in combination, said second conductive path formed by the connection of said second connector through said body portion to a conductive strip extending along said top side of said cap.

6. An adapter system for a 9 volt battery for utilization with an electronic camera comprising:
   a battery clip, said clip further comprising:
      a c-shaped conductive strap having a head section, said head section having a first connector on an underside for connection to a first terminal of said 9 volt battery, a body section extending downward from said head section, and a foot section on a distal end of said body section, said foot section extending generally perpendicular to said body section and generally parallel to and spaced apart from said head section;
      two spaced-apart clamping arms attached to said body section for engagement with said 9 volt battery to secure said 9 volt battery within said clip; and
   a battery holder cap, said cap further comprising:
   a non-conductive body portion having a first end with an opening, a closed second end, and a receiving chamber, said opening in said first end sized to accept said battery clip and said 9 volt battery into said receiving chamber, said receiving chamber having an inner ceiling with a second connector attached thereto by a fastener for connection to a second terminal of said 9 volt battery, said fastener extending through said closed second end of said body portion and conductively fastening said second connector to a generally flat conductive strip extending along the surface of said closed second end of said body portion, said flat conductive strip electrically insulated from said foot section of said battery clip by said body portion of said battery holder cap.

* * * * *